US006958923B2

(12) United States Patent
Nuutinen

(10) Patent No.: US 6,958,923 B2
(45) Date of Patent: Oct. 25, 2005

(54) RECTIFYING CIRCUIT

(75) Inventor: Leo Nuutinen, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/484,244

(22) PCT Filed: Oct. 24, 2002

(86) PCT No.: PCT/FI02/00829

§ 371 (c)(1),
(2), (4) Date: Jan. 20, 2004

(87) PCT Pub. No.: WO03/036784

PCT Pub. Date: May 1, 2003

(65) Prior Publication Data

US 2004/0179379 A1 Sep. 16, 2004

(30) Foreign Application Priority Data

Oct. 25, 2001 (FI) ................................. 20012074

(51) Int. Cl.[7] .............................................. H02H 7/125
(52) U.S. Cl. ........................................................ 363/54
(58) Field of Search ........................ 363/52–54, 85–88, 363/128, 129, 160–162

(56) References Cited

U.S. PATENT DOCUMENTS 5,084,812 A * 1/1992 Hausler et al. ............... 363/72
5,491,624 A * 2/1996 Levran et al. ................ 363/87

FOREIGN PATENT DOCUMENTS

DE 9216662.8 3/1993
DE 19508348 9/1996
DE 19710371 9/1998
JP 02001238459 A * 8/2001 ........... H02M 7/48

OTHER PUBLICATIONS

Subhashish Battacharya et al., Power Electronics, Drives and Energy Systems for Industrial Growth 1996; Active Filer Solutions For Utility Interface of Industrial Loads; page(s) 1078-1084 vol. 2, no month.

* cited by examiner

*Primary Examiner*—Gary L Laxton
(74) *Attorney, Agent, or Firm*—Dykema Gossett PLLC

(57) ABSTRACT

The invention relates to a rectifying circuit comprising a bridge connection with RC protected thyristors, a direct voltage circuit with capacitance and a charging circuit containing a diode (3) or a corresponding component for charging the capacitance of the direct voltage circuit. According to the invention, a resistance, which comprises one or more resistors (4), of the RC protection of the thyristors is located in the charging circuit.

5 Claims, 2 Drawing Sheets

RECTIFYING CIRCUIT

BACKGROUND OF THE INVENTION

The invention relates to rectifying circuits that comprise a bridge connection with RC protected thyristors, a direct voltage circuit with capacitance and a charging circuit for charging the capacitance of the direct voltage circuit.

Rectifying circuits are an essential part of not only actual rectifiers, but also many other electrotechnical devices, such as frequency converters. Rectifying circuits often employ thyristors. The reverse-recovery currents generated in thyristors may cause high overvoltage, because electric circuits always contain inductances. For this reason RC protection is commonly used for protecting thyristors.

Rectifying circuits comprising a bridge connection with RC protected thyristors, a direct voltage circuit with capacitance and a charging circuit for charging the capacitance of the direct voltage circuit are conventionally implemented by connecting a series-connected capacitor and resistor in parallel with each thyristor in question, the charging circuit comprising a diode and a charging resistor connected in series.

The above arrangement involves many problems. Due to the high number of components, the costs arising from the components and their assembly are high. Moreover, the resistors used in RC protection are usually arranged on a printed board containing, in addition to the resistors, at least RC protection capacitors and thus the resistors not only take up part of the printed board surface, but also complicate the cooling of the control card space, for example, thereby shortening the life cycle of the cards and making their positioning problematic. Further, because the RC protection resistors' power handling capacity is poor, it is difficult to increase the capacitances in situations where it would be required due to issues related to EMC or earth fault tolerance, for example.

BRIEF DESCRIPTION OF THE INVENTION

It is an object of the invention to simplify the structure of a rectifying circuit that comprises one or more RC protected thyristors and a charging circuit with a charging resistor. This is achieved by a combined charging circuit and thyristor RC protection, characterized by what is stated in the independent claim. The preferred embodiments of the invention are disclosed in the dependent claims.

The invention is based on the idea that in a rectifying circuit comprising both a charging circuit with a charging resistor and one or more RC protected thyristors, the charging resistor is positioned in such a way that separate resistors are not needed for the RC protection of the thyristors, but the charging resistor carries out their tasks. This solution provides a number of significant advantages.

Since separate resistors for the RC protection of the thyristors are not needed, the costs arising from the related components and their assembly are avoided; for a 6-pulse inverter, for example, they would be 5 to 15 EUR. Compared with the prior art arrangement in which the RC protection resistors are arranged on the printed board the fact that they are not needed provides a mechanically more spacious configuration, enhances the cooling of the control card space and thereby lengthens the life cycle of the cards. In addition, the positioning of the cards becomes easier. Further, the connection of the invention is expected to reduce the amount of conducted emissions and to possibly enable one RF card to be left out, or to lighten its configuration. Compared with the prior art, the connection of the invention allows the capacitance of the capacitors to be increased without any problems, because the charging resistor is capable of tolerating a high power.

BRIEF DESCRIPTION OF THE DRAWINGS

In the following, the invention will be described in greater detail and with reference to the accompanying drawings, in which.

DETAILED DESCRIPTION OF THE INVENTION

Figure 1:
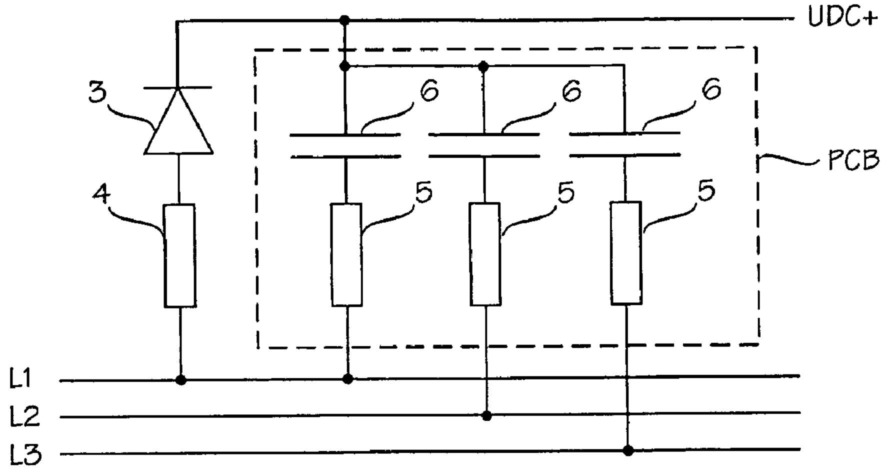
FIG. 1 illustrates a prior art connection, which comprises a charging circuit and RC protection for three thyristors.

FIG. 1 illustrates a prior art connection comprising a charging circuit and an RC protection for three thyristors (not shown). With reference to FIG. 1, the charging circuit comprises a diode 3 and a charging resistor 4 coupled in series and the RC protection of each thyristor comprises a resistor 5 and a capacitor 6 coupled in series and arranged on a printed circuit board PCB. The charging circuit is connected between phase L1 of a three-phase supply network and a positive voltage UDC+ of a direct voltage circuit. The RC protections are connected between the three-phase supply network and the positive voltage UDC+ of the direct voltage circuit such that a first RC protection is connected between phase L1 and the UDC+, a second RC protection between phase L2 and the UDC+ and a third RC protection between phase L3 and the UDC+.

Figure 2:
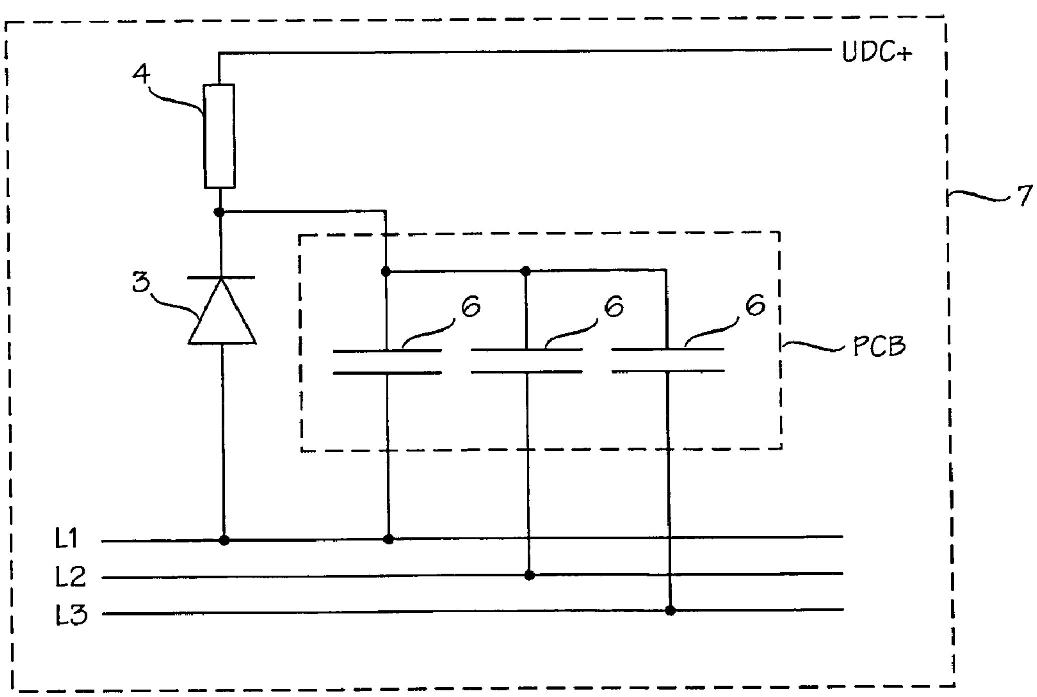
FIG. 2 illustrates a connection according to a preferred embodiment of the invention comprising a combined charging circuit and RC protection of thyristors.

FIG. 2 shows a connection according to a preferred embodiment of the invention comprising a combined 7 charging circuit and RC protection of thyristors (not shown). With reference to FIG. 2, the charging circuit comprises a charging resistor 4 and a diode 3, the RC protection of each thyristor comprising a charging resistor 4 and a capacitor 6 arranged on a circuit board PCB. The charging circuit is connected between phase L1 of a three-phase supply network and a positive voltage UDC+ of a direct voltage circuit such that when seen from the supply network side, the diode 3 comes before the charging resistor 4. The RC protection capacitor 6 of the thyristor connected to a specific phase of the supply network is connected between that phase and a charging circuit point located between the diode 3 and the charging resistor 4.

Figure 3:
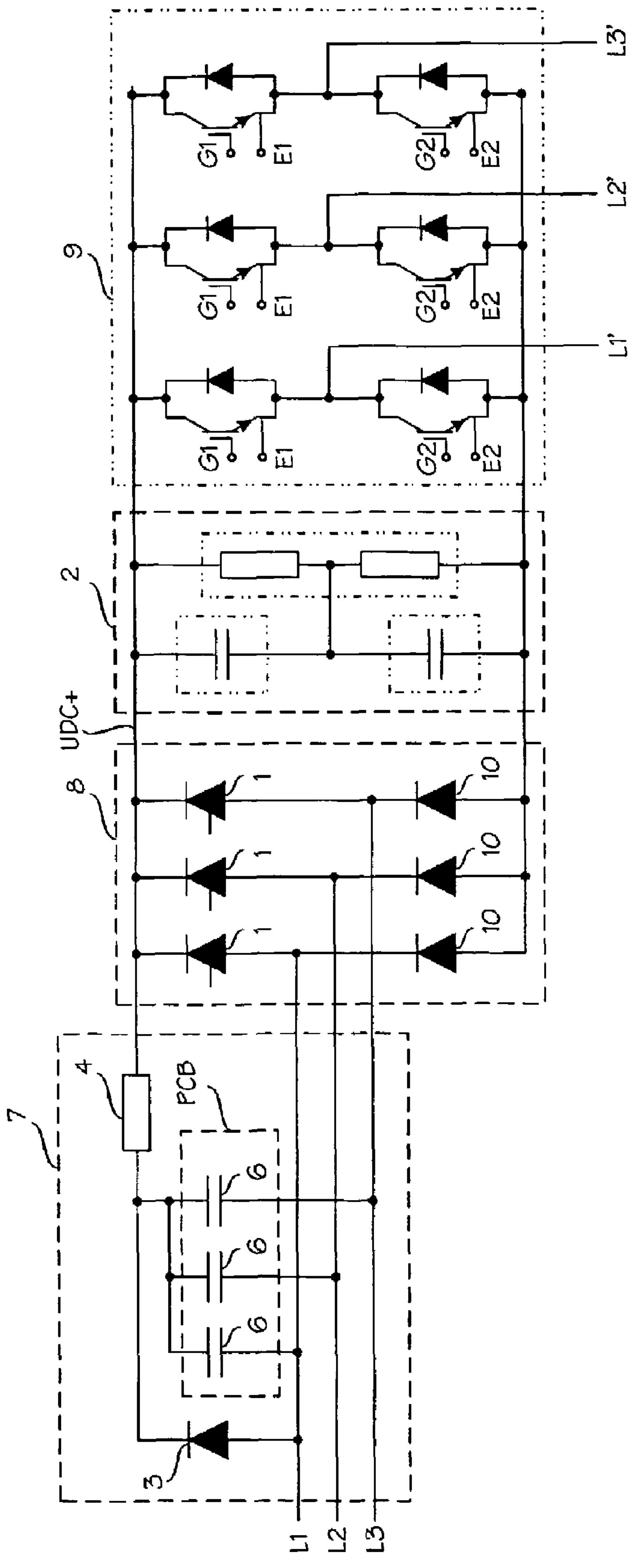
FIG. 3 illustrates a frequency converter connection comprising the combined charging circuit and RC protection of thyristors shown in FIG. 2.

FIG. 3 illustrates a frequency converter connection comprising the combined 7 charging circuit and thyristor RC protection shown in FIG. 2. With reference to FIG. 3, the frequency converter connection comprises, in addition to the combined 7 charging circuit and thyristor RC protection, a bridge connection 8 with thyristors 1 and diodes 10, an intermediate direct voltage circuit 2, and an inverter circuit 9. The thyristors 1 in the bridge connection 8 are connected between the three-phase supply network and the positive current UDC+ of the direct voltage circuit 2 such that a first thyristor is connected between phase L1 and the UDC+, a second thyristor between phase L2 and the UDC+, and a third thyristor between phase L3 and the UDC+. The output phases of the frequency converter connection are indicated by L1'. L2' and L3'.

It is obvious to a person skilled in the art that as technology advances the basic idea of the invention can be implemented in various ways. The invention and its embodiments are therefore not restricted to the above examples, but may vary within the scope of the claims.

What is claimed is:

1. A rectifying circuit comprising a bridge connection with RC protected thyristors, a RC protection of each said RC protected thyristor comprising series-connected capacitor and resistor in parallel with said RC protected thyristor, the rectifying circuit further comprising a direct voltage circuit with capacitance and a charging circuit containing a rectifying component arranged for charging the capacitance of the direct voltage circuit, wherein said RC protection resistor of each said RC protected thyristor is connected in series with said rectifying component.

2. A rectifying circuit according to claim 1, wherein there is exactly one resistor connected in series with said rectifying component, said one resistor thereby functioning as the RC protection resistor for each said RC protected thyristor.

3. A rectifying circuit according to claim 1, wherein said rectifying component is a diode.

4. A rectifying circuit according to claim 2, wherein said rectifying component is a diode.

5. A frequency converter assembly comprising a rectifying circuit according to claim 1, wherein said direct voltage circuit is an intermediate direct voltage circuit of the frequency converter assembly.

* * * * *